J. H. SIEGFRIED.
MOWER.
APPLICATION FILED SEPT. 26, 1907.
903,795.
Patented Nov. 10, 1908.
2 SHEETS—SHEET 1.
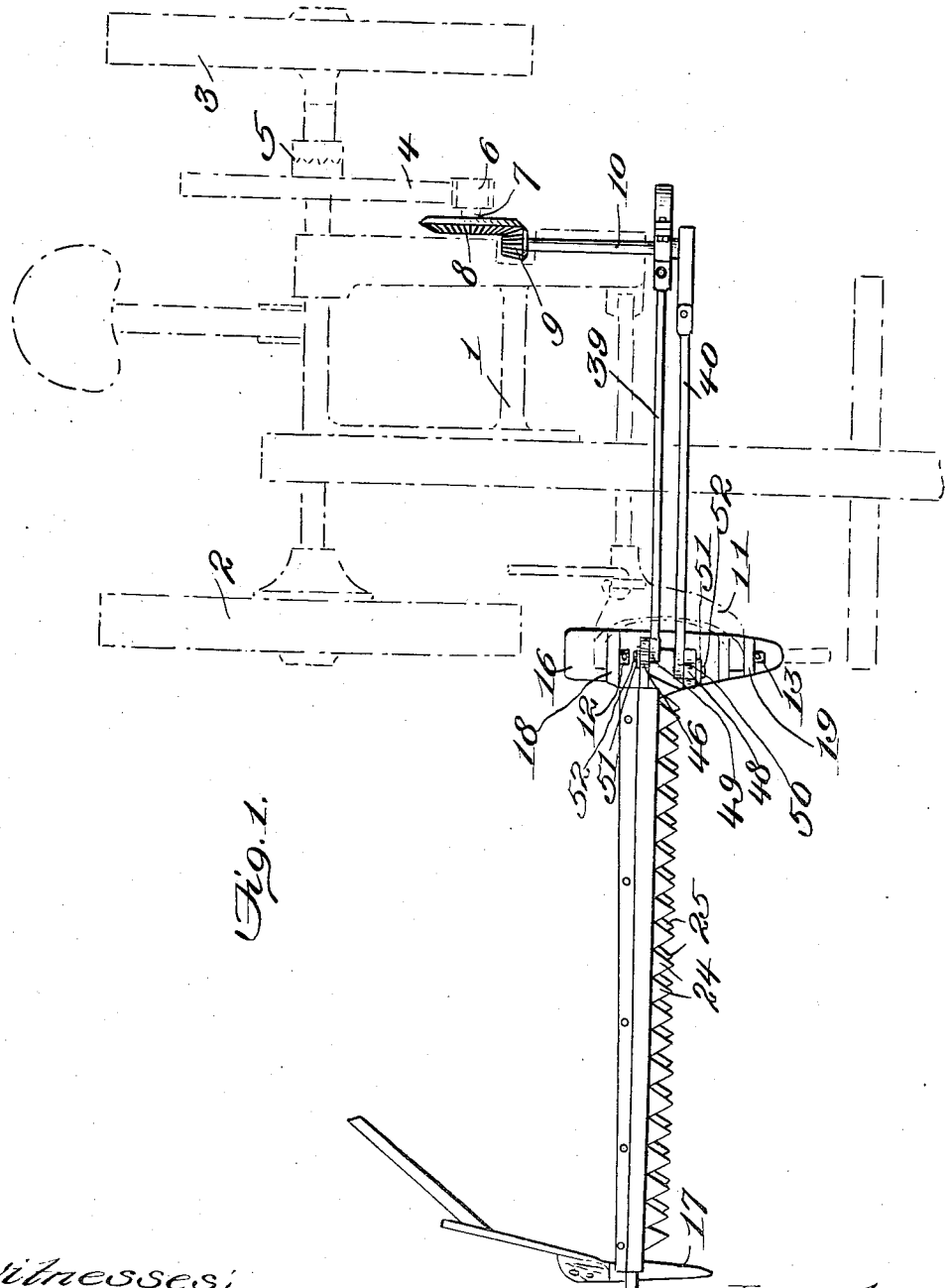
Witnesses:
Inventor
John Henry Siegfried
James L. Norris
Atty J. H. SIEGFRIED.
MOWER.
APPLICATION FILED SEPT. 26, 1907.
903,795.
Patented Nov. 10, 1908.
2 SHEETS—SHEET 2.
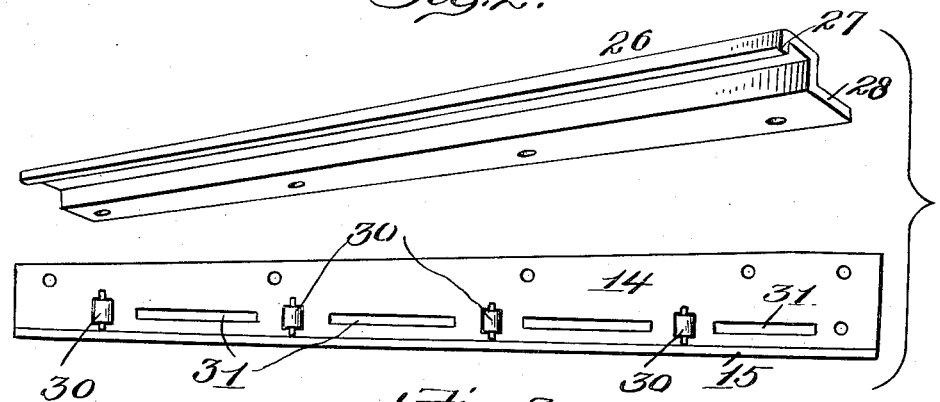
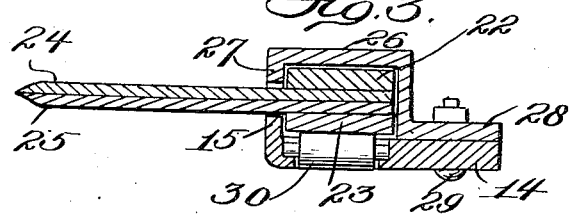
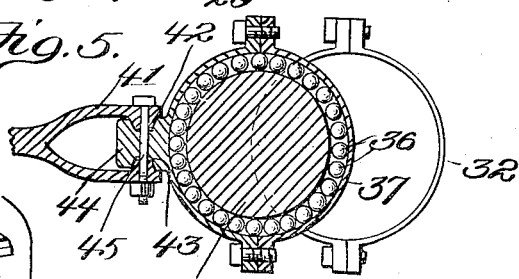
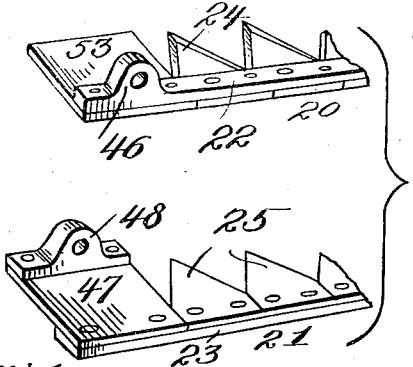
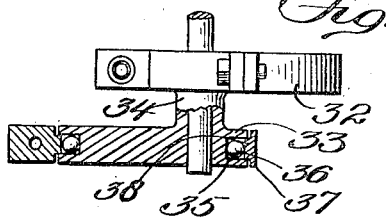
Witnesses
Inventor
John Henry Siegfried
James L. Norris
Atty.

UNITED STATES PATENT OFFICE.

JOHN HENRY SIEGFRIED, OF LEMOORE, CALIFORNIA.

MOWER.

No. 903,795.  Specification of Letters Patent.  Patented Nov. 10, 1908.

Application filed September 26, 1907. Serial No. 394,669.

*To all whom it may concern:*

Be it known that I, JOHN HENRY SIEGFRIED, a citizen of the United States, residing at Lemoore, in the county of Kings and State of California, have invented new and useful Improvements in Mowers, of which the following is a specification.

My present invention relates to improvements in mowers, and especially of the vertical bar class; and it has for its object primarily to provide an improved device of this character wherein the cutting speed of the knives with a given ratio of gearing is increased, so that the mowing operation is performed with greater uniformity and with an expenditure of less power.

Another object of the invention is to obviate the use of the relatively fixed guards by the use of a pair of coöperatively arranged knives provided with means for simultaneously reciprocating them in opposite directions, the stems of the material to be mowed being thereby engaged by a knife edge at opposite sides during the operation of the knives, so that a double cutting action serves to sever the stems, and by obviating the use of the usual guards, there is no liability of choking of the knives.

Further objects of the invention are to provide a knife attachment of the character described that is capable of being applied universally to mowers of the several well known types, to provide improved mountings for the knives whereby the friction thereof is reduced to a minimum, to so mount the latter that a self-sharpening action thereof is effected, and to provide simple and efficient knife operating devices that are capable of being readily applied to mowers of the usual or well known type without material modification.

To these and other ends, the invention consists in certain improvements, and combinations and arrangements of parts, all as will be hereinafter more fully described, the novel features being pointed out particularly in the claims at the end of the specification.

In the accompanying drawings:—Figure 1 is a top plan view of a mower equipped with cutting knives constructed in accordance with the present invention, the body of the mower being shown conventionally in dotted lines; Fig. 2 is a detail view of the knife-carrying arm and covering cap detached from the machine; Fig. 3 represents a transverse section of the knives and the supporting arm; Fig. 4 is a detail perspective view of the inner ends of the cutting knives showing means for operatively connecting them to the pitman; Fig. 5 is a detail view, partly in section, of the eccentrics by means of which the knives are simultaneously reciprocated or vibrated in opposite directions; Fig. 6 is a plan view of the operating eccentrics shown in Fig. 5.

Similar parts are designated by the same numerals of reference in the several figures.

Cutter knives constructed in accordance with the present invention are capable of being applied universally to mowers of the several well known types, and that form of the invention shown in the present embodiment thereof is adapted to be interchangeably applied to mowers of the vertical bar type, that is to say, those wherein the vibratory cutter knife or knives are carried by an arm which is pivoted on the machine in a way that will permit it to occupy horizontal or vertical positions, and positions intermedate thereof, the knife or knives normally operating in a horizontal plane on a level, and in a plane at an incline to the horizontal when operating on a terrace, the vertical position of the knife or knives being useful during the transportation of the machine from one field to another, or when it is desirable or necessary to clear obstructions in the path of the cut.

In the present instance the invention is shown applied to a mower of ordinary form embodying, generally, a frame 1 supported by the driving wheels 2 and 3 and provided with a suitable multiplying gear for effecting the vibratory movements of the knives at the requisite speed, the gearing shown in the present instance comprising a spur wheel 4 adapted to be connected and disconnected relatively to the driving wheels by means of a clutch 5, the spur wheel coöperating with a pinion 6 on a counter-shaft 7, the latter carrying a beveled gear 8 which engages a coöperating gear 9 upon the driving shaft 10. The machine frame is provided at one side with a bracket 11 which serves as a pivotal support for the knife attachment, the bracket being provided for this purpose with a pair of pivot pins 12 and 13 having their axes arranged in alinement and extending in a direction substantially longitudinally of the machine.

The knife attachment as shown in the present embodiment of the invention comprises, generally, an arm 14 which corresponds to the usual finger-bar of the ordinary mower, the arm being substantially flat to form a support and guide for the knives; and its forward edge is upturned to form a flange 15 which preferably extends throughout its length. The arm is usually supported in proper relation to the ground while in operation by means of the inner and outer shoes 16 and 17 respectively, the inner shoe being provided with a pair of eyes 18 and 19 to receive the pivot pins 12 and 13 respectively of the supporting bracket and coöperating therewith to guide the arm for movement in a vertical plane. Any suitable means may be employed for lifting and lowering the arm, the lever employed in mowers of the usual types being suitable for this purpose. The knives 20 and 21 are mounted to vibrate in a direction longitudinally of the arm and in reverse directions relatively to one another; and those shown in the present instance are composed of a pair of knife bars 22 and 23, the lower knife bar resting above the upper side of the supporting arm and with its forward edge in coöperative relation with the forward flange 15 thereon, and the knife bars are provided with the sets of sectional knife blades 24 and 25, the latter being so arranged that the flat sides of the blades are in engagement with one another while the knife bars are arranged above and below them. The cutting edges of these knife blades are also beveled towards their coöperating surfaces so that when they slide over one another a shearing action is produced. The two knives are retained in position on the supporting arm by means of a removable cap or casing 26 which preferably extends throughout the length of the knives and has a depending flange 27 at its forward edge arranged to coöperate with the corresponding edge of the upper knife bar, while the rear portion thereof is directed downwardly and extended rearwardly to form an attaching flange 28 which is adapted to coöperate with the upper side of the supporting arm and is secured thereto by bolts or other suitable devices 29. In practice, this cap or casing not only serves to retain the knives in operative position, but it also excludes stones and dirt from the knives so that wear thereon is minimized and undue friction is avoided.

In order to further reduce the friction on the knives so that they may operate with the greatest facility, it is preferable to provide a set of supporting rollers 30 that are journaled at their ends in upwardly opening transversely spaced recesses formed at suitable intervals on the arm and coöperate with the lower knife bar 23, the latter resting upon these rollers and serving to retain them in operative position and in order to permit the escape of any sand that may enter beneath the knives it is preferable to provide the knife carrying arm with one or more slots 31 which extend longitudinally between the respective rollers and through which the sand may be discharged.

According to the present invention the knives are simultaneously reciprocated in opposite directions, and while it will be understood that any suitable driving mechanism may be employed for effecting these movements, it is preferable to employ a driving mechanism similar to that shown in the present instance, which embodies a pair of eccentrics 32 and 33 fixed to the operating shaft 10 and set at 180° relative to one another. In order to facilitate mounting of the eccentrics and to insure proper relation thereof at all times, it is preferable to form the two eccentrics of a single casting connected by a sleeve 34 which is bored to receive the operating shaft, a set-screw or other suitable means being employed for securing the eccentrics thereon. It is also preferable to minimize friction during the operation of the eccentrics, and for this reason the grooves 35 in the peripheries of the eccentrics, in the present instance constitute ball races in which the anti-friction balls or rollers 36 operate, and the eccentric straps 37, have inwardly extending flanges 38 which coöperate with the anti-friction balls or rollers and also with the parallel walls of the grooves to prevent lateral displacement of the straps.

The reciprocatory movements of the eccentrics are transmitted to the knives by means of the eccentric rods or pitmen 39 and 40. In those mowers wherein the knife carrying arm is capable of tilting on an axis transverse to the pivot about which it swings, which tilting or rocking movement involves a relative forward and rearward motion of the lower portion of the arm, it is preferable to provide the eccentric rods or pitmen with compensating connections whereby the forward and rearward movements just described may take place without a twisting or binding action of the eccentric straps relatively to the respective eccentrics, the eccentric rods being provided, in the present instance, with forked ends 41 having oppositely arranged inwardly extending projections 42 adapted to coöperate with similarly arranged recesses 43 formed in a lug 44 on the respective eccentric strap, a bolt or equivalent part 45 extending through the lug of the strap and connecting the forked arms to secure the parts in coöperative relation.

The outer ends of the eccentric rods or pitmen may be connected to the respective knives in any suitable way, the upper knife bar in the present instance being provided with an eye 46 extending directly upwardly therefrom, while the lower knife bar is provided with a lateral off-set extension 47 having an eye 48 thereon, the two eyes being off-set relatively to each other and adapted to receive the laterally turned ends 49 and 50 of the respective eccentric rods. The latter may be secured against disengagement relatively to the eyes either by use of the well known cotter pins, or they may be secured by washers 51, which in turn are fastened by bolts 52. When the knives are so constructed the knife sections do not extend quite to the inner ends of the knife bars, a plate 53 being preferably riveted to the bar of the upper knife in place of the knife sections and providing a coöperating bearing surface for the off-set portion 47 of the lower knife.

The movement of the mower over the ground causes a revolving movement of the driving wheels, which in turn is transmitted at an increased speed to the operating shaft 10, the reversely arranged eccentrics on the latter producing reciprocatory movements of the eccentric rods in reverse directions, which in turn are transmitted to the knives. The material to be cut enters between the pointed knife blades or sections of the upper and lower knives, and as both edges of each knife section are sharpened and approach the material from the opposite sides thereof, the stems of the material will be sharply severed by a cutting action, the cutting edges engaging at opposite sides thereof. Moreover, as there are two knives operating simultaneously in reverse directions, the aggregate cutting speed is practically doubled as compared to mowers of the ordinary type, wherein the movable blades coöperate with relatively fixed guards, the latter serving to hold the stems of the material while the cutting action takes place.

The rapid movements of the knives involve very little friction for the reason that the hardened blades or knife sections of the two knives slide upon one another, while the weight of the knives is sustained by the anti-friction rollers interposed between them and the knife carrying arm. As the eyes of the respective knives provide pivotal connections between the knives and the respective pitmen, it will be understood that the usual swinging movements of the knife carrying arm while being elevated and lowered can take place without disturbing the operative connection between the knives and the driving mechanism.

An important advantage obtained by the present invention is that choking which is an objectionable feature of mowers of the usual kind using relatively fixed guards, is obviated for the reason that the material is cut from both directions by the double knives so that it cannot become jammed and thus impede the movement of the knives.

I claim as my invention:

1. A knife attachment for mowers embodying a knife carrying arm, a pair of cutting knives comprising bars guided to reciprocate longitudinally of the arm, knife blades secured to the proximate surfaces of the bars and having sliding engagement with one another, and attaching eyes, one of the latter being formed on one of the bars and the other being supported on a plate attached to the other bar, and means coöperating with the said eyes for simultaneously reciprocating the knives in reverse directions.

2. In a knife attachment for mowers, the combination with an arm having an upturned flange extending longitudinally of its forward edge, of a pair of coöperating knives, comprising a pair of longitudinally movable bars, the lower bar coöperating with the said flange as a guide, sets of blades secured to the proximate faces of the bars and having sliding engagement with one another, an attaching eye formed in alinement with and attached to the upper knife bar, a plate secured to and extending laterally of the lower knife bar, an eye carried by the said plate and off-set laterally of the eye first mentioned, means coöperating with the respective eyes for simultaneously reciprocating the knives in reverse directions, and a casing extending longitudinally of the knife supporting arm and coöperating with the bar of the upper knife.

3. In a knife attachment for mowers, the combination with an arm having an upturned flange at its forward edge, of a pair of coöperating knives comprising upper and lower bars, the lower bar coöperating with the said flange on the arm as a guide, a casing detachably secured to the upper side of said arm and coöperating with the upper bar, sets of coöperating knife blades secured to the proximate faces of said bars, an eye formed on the upper bar, a bearing plate secured to the under side of the upper bar beneath the eye thereon, a plate secured to the upper side of the lower bar and adapted to coöperate with the plate first mentioned, an eye secured to the upper side of the plate on the lower bar, and means coöperating with the said eyes for simultaneously reciprocating the knives in reverse directions.

4. In a knife attachment for mowers, the combination with an arm having its forward edge upturned to form a flange, of a pair of knives comprising bars movable longitudinally of the arm, the lower bar coöp- erating at its forward edge with the flange on the arm, coöperating sets of knife blades arranged between the bars, a casing detachably secured to the upper side of the arm having a depending flange at its forward edge adapted to coöperate with the corresponding edge of the upper knife bar and having a depending portion to engage the rear edges of the upper and lower knife bars to guide them, a pair of attaching eyes, one arranged on the upper bar and the other offset laterally relatively to the said casing, coöperating plates attached to and interposed between the respective bars, the one on the lower plate carrying the offset eye, said plates having a thickness equal to that of the knife blades and slidable on one another, and means coöperating with said eyes for simultaneously reciprocating the knives.

5. A knife attachment for mowers comprising an arm provided in its upper surface with a set of upwardly opening recesses arranged at intervals longitudinally thereof and having longitudinally extending slots formed therein between said recesses, a pair of knives comprising longitudinally extending bars and sets of knife blades arranged between them, a set of anti-friction rollers journaled in said recesses on axes transverse to the length of said arm and having a rolling engagement with the longitudinal bar of the lower knife, and a protective casing co-extensive with the length of said arm and secured to the upper side thereof, said casing coöperating with the longitudinally extending bar of the upper knife to guide the same and serving to hold both knives in operative position to prevent displacement of the supporting rollers.

6. A knife attachment for mowers comprising a knife carrying arm adapted for attachment to the mower and having roller receiving recesses formed in the upper side of said arm, a pair of reversely arranged cutting knives comprising upper and lower bars extending longitudinally of the knife carrying arm, a set of supporting rollers removably fitted in said recesses of the knife carrying arm and having oppositely projecting journals for supporting them with their axes arranged transverse to the line of movement of the knives, said rollers coöperating with the lower knife bar, and a casing secured to the knife carrying arm and having a continuous portion coöperating with the bar of the upper knife to guide and protect the latter, and eyes carried by the bars of the respective knives and offset laterally relatively to one another.

In testimony whereof I have hereunto set my hand in presence of two subscribing witnesses.

JOHN HENRY SIEGFRIED.

Witnesses:
EDWARD FLANGER,
J. H. THOMSEN.